A. SEIBERT.
RESILIENT WHEEL.
APPLICATION FILED SEPT. 9, 1911.
1,040,436.
Patented Oct. 8, 1912.
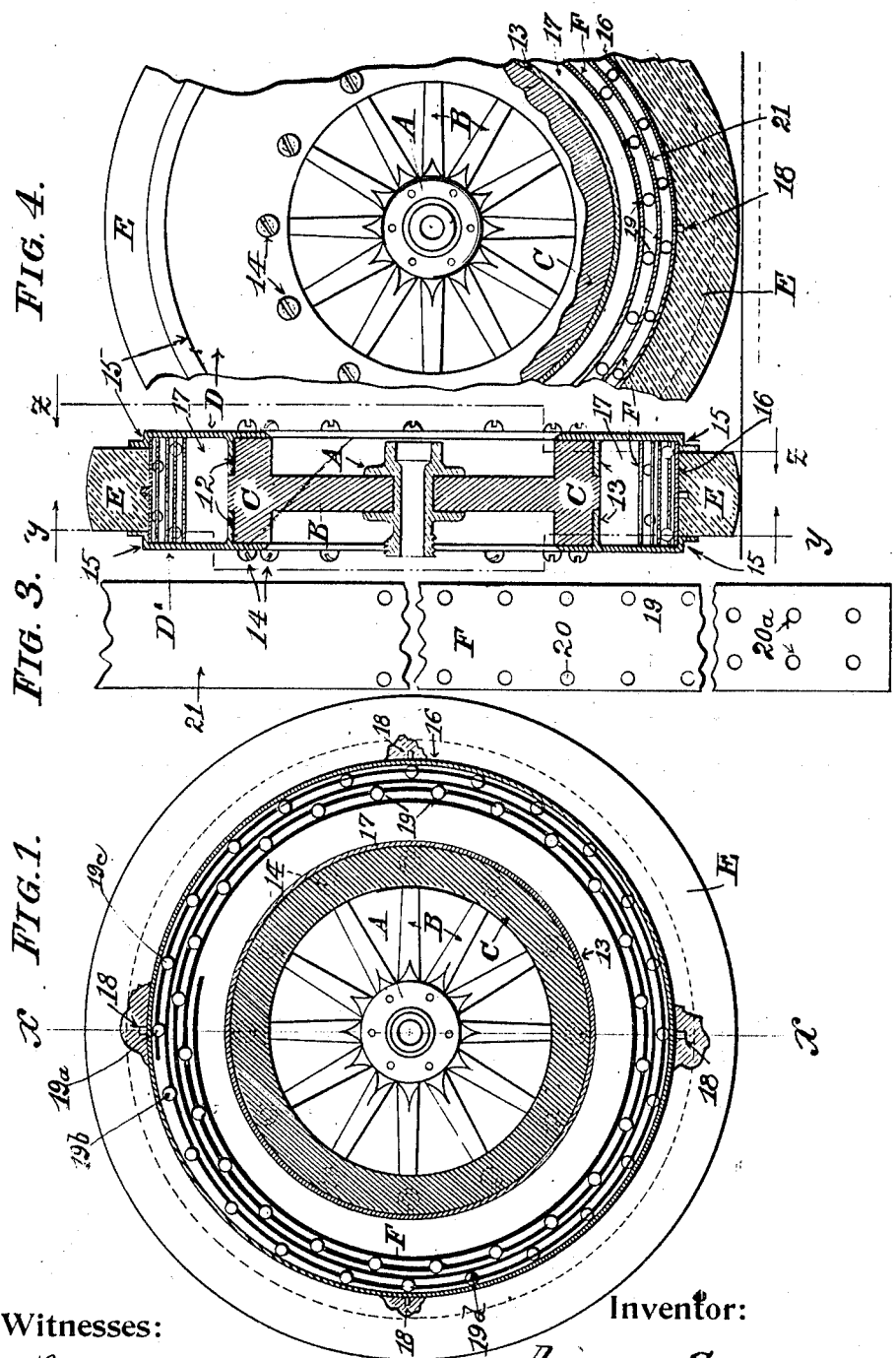
Witnesses:
E. B. Knudsen
A. S. Peterson.
Inventor:
AUGUST SEIBERT,
By Meichael Stark & Sons,
Attorneys

UNITED STATES PATENT OFFICE.

AUGUST SEIBERT, OF HARVEY, ILLINOIS.

RESILIENT WHEEL.

1,040,436.  Specification of Letters Patent.  Patented Oct. 8, 1912.

Application filed September 9, 1911. Serial No. 648,455.

*To all whom it may concern:*

Be it known that I, AUGUST SEIBERT, a citizen of the United States, and resident of Harvey, in the county of Cook and State of Illinois, have invented certain new and useful Improvements in Resilient Wheels; and I do hereby declare that the following description of my said invention, taken in connection with the accompanying sheet of drawings, forms a full, clear, and exact specification, which will enable others skilled in the art to which said invention appertains to make and use the same.

This invention has general reference to resilient wheels; and it consists, essentially, in the novel and peculiar combination of parts and details of construction, as hereinafter first fully set forth and described, and then pointed out in the claim.

The object of this invention is to provide for an improved construction of a cushion-tired wheel whereby the wheel is made resilient, the construction being applicable to existing wooden wheels as well as other vehicle wheels.

In the drawings already referred to, which serve to illustrate this invention more fully, Figure 1 is a sectional view of this resilient wheel on line $y$—$y$ of Fig. 2. Fig. 2 is a sectional view on line $x$—$x$ of Fig. 1. Fig. 3 is a plan of a fragment of the spring employed in this wheel. Fig. 4 is an elevation of portions of the wheel, partly in section, the sectional portion being on line $z$—$z$ of Fig. 2.

Like characters and symbols of reference denote the same parts in all the figures.

This wheel, as such, comprises the usual hub A, spokes B, and felly C, a wheel which is in almost universal use on automobiles and other vehicles. In the periphery of this felly, at the margins thereof, there are provided grooves 12, and in these grooves there are located the flanges 13, formed on two annular side plates D, D', which side plates are permanently secured to the flanks of the felly C, preferably by screws 14, or similarly effective means. These side plates have offsets or shoulders 15; and they are constructed to afford an annular groove within which the cushion tire E is located. This cushion tire is forced into an annular band 16, which band is nearly as wide as the felly, and it occupies an annular space 17, between the felly and the side plates D, D', and bearing normally against the shoulders 15 on said side plates. This band has projecting from its outer periphery spuds or spurs 18, which are embedded in the inner perimeter of the tire and prevent the latter from creeping on the former, but cause the band to rotate with the tire should the same creep, as it naturally will, in the groove between the said side plates.

The band 16 is preferably formed of a hardened quality of steel possessing a certain degree of elasticity to enable it to resume its original normal rotundity after having been deflected therefrom, said band forming, in addition to its function of a reinforce for the tire, a track for a double series of antifriction balls 19, as will hereinafter more fully appear.

In the annular space 17, there is located a helical spring F, having a number of convolutions, like a clock-spring, a portion of which is illustrated in Fig. 3. In this spring there are near its margins a double series of perforations 20, constructed to receive and serve as retainers for, said antifriction balls 19, there being in this spring two sections of these perforations and two sections in which there are no perforations. This spring in its relaxed condition is larger in diameter than the inner diameter of the band 16, so that the spring is in tension when contracted and inserted in said band, the balls in the outer row bearing against the inner surface of the band 16, and against the non-perforated section 21, of the second convolution of said spring, while the second row of balls bear against the non-perforated section first mentioned, and the next succeeding non-perforated convolutions.

In operation the weight of the vehicle and its load rests upon, or is carried by, the wheels thereby causing the wheels to be downwardly forced which affects the rotundity of the tire to cause it to flatten and to move, as it were, vertically between the side plates, the movement being resisted by the spring F, which spring partakes of slight rotary or shifting movement, the condition of a wheel when under a load, being illustrated in Fig. 4.

It will now be observed that in existing cushioned-tire wheels the fixed rim that holds the tire will be removed therefrom and then the wheel turned in a lathe to produce therein the two marginal grooves 12 to receive the flanges 13 of the side plates, whereby these side plates are correctly centered upon the felly. These side plates I prefer to produce in the process of casting, and to employ aluminum as the casting metal owing to its low specific gravity and its non-corrosive qualities; but I desire it to be understood that I do not wish to confine myself to this specific construction, and that I may vary the same should I find a change necessary or desirable.

I have heretofore stated that the spring F is provided with a double series of perforations to receive antifriction balls, said perforations being located near the longitudinal margins of the spring. But since there is a possibility of the balls at one end of the spring, when the latter is contracting, reaching the nearest adjacent balls, in the convolutions of the spring, as for instance, the balls indicated by $19^a$, in Fig. 1, reaching the balls $19^b$, which it could not pass, I arrange these perforations in such manner that the balls $19^a$, $19^c$ to $19^d$, approximately, are on the outer set of perforations 20, while the balls $19^e$ to $19^b$ are in the inner series of perforations, $20^a$, as shown in Fig. 3, it being evident that the first series of perforations may be near the outer margins of the spring F, and the second series nearer to the longitudinal center line thereof, (or vice versa) as long as the balls are so arranged that they pass one another when required.

Having thus fully described this invention, I claim as new and desire to secure to me by Letters Patent of the United States—

In a resilient wheel, means for resisting the movement of the tire, comprising, in combination, a resilient endless band constructed to bear against the inner surface of said tire, a helical spring surrounded by said endless band, said helical spring having coils of decreasing diameter as they approach the center of said wheel, there being in said helical spring convolutions having a series of perforations close to the margins of said spring, and further series of perforations closer together than the series at the margins, and convolutions that are non-perforated, the perforated and the non-perforated convolutions alternating, and antifriction means located in, and retained by, said perforations, the inner surface of said resilient band and both sides of the non-perforated convolutions of said helical spring affording tracks for the antifriction means.

In testimony that I claim the foregoing as my invention, I have hereunto set my hand in the presence of two subscribing witnesses.

AUGUST SEIBERT.

Witnesses:
GEORGE W. HOWARD,
G. B. CLAWSEN.

---

Copies of this patent may be obtained for five cents each, by addressing the "Commissioner of Patents, Washington, D. C."